(12) United States Patent
Bentz (10) Patent No.: US 9,256,577 B2
(45) Date of Patent: *Feb. 9, 2016

(54) APPARATUSES AND RELATED METHODS FOR OVERFLOW DETECTION AND CLAMPING WITH PARALLEL OPERAND PROCESSING

(71) Applicant: Micron Technology, Inc., Boise, ID (US)

(72) Inventor: Ole Bentz, Portland, OR (US)

(73) Assignee: Micron Technology, Inc., Boise, ID (US)

( * ) Notice: Subject to any disclaimer, the term of this patent is extended or adjusted under 35 U.S.C. 154(b) by 336 days.

This patent is subject to a terminal disclaimer.

(21) Appl. No.: 13/758,577

(22) Filed: Feb. 4, 2013

(65) Prior Publication Data

US 2013/0151579 A1  Jun. 13, 2013

Related U.S. Application Data

(60) Continuation of application No. 11/712,765, filed on Feb. 28, 2007, now Pat. No. 8,370,415, which is a division of application No. 09/651,159, filed on Aug. 30, 2000, now Pat. No. 7,206,800.

(51) Int. Cl.
  *G06F 7/499* (2006.01)
  *G06F 17/10* (2006.01)
(52) U.S. Cl.
  CPC ............ *G06F 17/10* (2013.01); *G06F 7/49921* (2013.01)
(58) Field of Classification Search
  None
  See application file for complete search history.

(56) References Cited

U.S. PATENT DOCUMENTS

| 3,725,649 | A |   | 4/1973  | Deerfield |
|-----------|---|---|---------|-----------|
| 4,282,581 | A |   | 8/1981  | Bondurant |
| 4,739,503 | A |   | 4/1988  | Armer et al. |
| 4,811,268 | A |   | 3/1989  | Nishitani et al. |
| 4,941,119 | A | * | 7/1990  | Moline ..................... 708/553 |
| 5,260,890 | A |   | 11/1993 | Suzuki |
| 5,289,396 | A |   | 2/1994  | Taniguchi et al. |
| 5,369,438 | A |   | 11/1994 | Kim |
| 5,448,509 | A |   | 9/1995  | Lee et al. |
| 5,508,951 | A |   | 4/1996  | Ishikawa |
| 5,539,685 | A |   | 7/1996  | Otaguro |
| 5,745,393 | A |   | 4/1998  | Wong |
| 5,745,397 | A |   | 4/1998  | Nadehara |
| 5,844,827 | A |   | 12/1998 | Wong |
| 5,847,978 | A |   | 12/1998 | Ogura et al. |
| 5,889,689 | A |   | 3/1999  | Alidina et al. |
| 5,907,498 | A |   | 5/1999  | Rim |
| 5,936,870 | A |   | 8/1999  | Im |
| 5,943,249 | A |   | 8/1999  | Handlogten |
| 5,991,843 | A |   | 11/1999 | Porterfield et al. |
| 6,037,947 | A |   | 3/2000  | Nelson et al. |

(Continued)

*Primary Examiner* — David H Malzahn
(74) *Attorney, Agent, or Firm* — TraskBritt (57) ABSTRACT

A method and apparatus for overflow detection and clamping with parallel operand processing for fixed-point multipliers is disclosed. The disclosure predicts when a multiplication of a number of operands will exceed a pre-determined number of bits based upon the fixed-point format of the operands. The prediction is performed in parallel with the multiplication of the operands. The multiplication need not be completed in full, but only to the extent to determine whether overflow exists. If an overflow detection occurs, clamping is instituted. The parallel operation of the overflow detection and the multiplication provides a faster clamping circuit than would otherwise be available from a serial multiplication followed by a clamping analysis.

29 Claims, 4 Drawing Sheets

(56) References Cited

U.S. PATENT DOCUMENTS

| | | |
|---|---|---|
| 6,061,781 A | 5/2000 | Jain et al. |
| 6,112,220 A | 8/2000 | Smith |
| 6,151,616 A | 11/2000 | Mahurin |
| 6,321,248 B1 | 11/2001 | Bonnet et al. |
| 6,499,046 B1 | 12/2002 | Nguyen et al. |
| 6,535,900 B1 | 3/2003 | Perets et al. |
| 6,574,651 B1 | 6/2003 | Cui et al. |
| 6,629,115 B1 | 9/2003 | Rossignol |
| 6,631,392 B1 | 10/2003 | Jiang et al. |
| 7,206,800 B1 | 4/2007 | Bentz |
| 8,370,415 B2 * | 2/2013 | Bentz ............... 708/553 |
| 2007/0156803 A1 * | 7/2007 | Bentz ............... 708/552 |
| 2013/0151579 A1 * | 6/2013 | Bentz ............... 708/553 |

* cited by examiner

| CLAMP CASE | Op1 >= | Op2 >= | Op1 LEADING ZEROS | Op2 LEADING ZEROS | TOTAL LEADING ZEROS |
|---|---|---|---|---|---|
| 1. | 0.100000.0000 | 0.000010.0000 | 0 | 4 | 4 |
| 2. | 0.010000.0000 | 0.000100.0000 | 1 | 3 | 4 |
| 3. | 0.001000.0000 | 0.001000.0000 | 2 | 2 | 4 |
| 4. | 0.000100.0000 | 0.010000.0000 | 3 | 1 | 4 |
| 5. | 0.000010.0000 | 0.100000.0000 | 4 | 0 | 4 |

APPARATUSES AND RELATED METHODS FOR OVERFLOW DETECTION AND CLAMPING WITH PARALLEL OPERAND PROCESSING

CROSS-REFERENCE TO RELATED APPLICATIONS

This application is a continuation of U.S. patent application Ser. No. 11/712,765, filed Feb. 28, 2007, now U.S. Pat. No. 8,370,415, issued on Feb. 5, 2013, which is a divisional of U.S. patent application Ser. No. 09/651,159, filed Aug. 30, 2000, now U.S. Pat. No. 7,206,800, issued Apr. 17, 2007, the disclosure of each of which is hereby incorporated herein by this reference in its entirety.

BACKGROUND

The present disclosure relates generally to the multiplication and clamping prediction of fixed-point multipliers. More particularly, the disclosure relates to a method and apparatus for increasing the speed of fixed-point data paths that involve multiplication of operands and parallel overflow detection, and clamping based upon the magnitude of those operands.

Electrical circuits are routinely employed to perform arithmetic operations of operands represented by logical representations. Generally, it is desirable for arithmetic circuitry, and in particular multiplication circuitry, to have the fewest number of bits in order to perform the required calculations. Minimization of the required number of bits facilitates speed of the calculating circuit. However, counter-balancing the desire to have a limited number of bits to perform a given calculation is to avoid answer overflow. Overflow, or the situation in which an answer will exceed the number of bits designed for the answer, is not acceptable, as valuable valid data may be lost in performing the calculations. In circuits that perform calculations with a number of bits that may yield answers that overflow the set number of bits, clamping can be used to ensure that a result that overflows is clamped to a given acceptable value. Normally, the largest magnitude positive or negative representable number is employed as the overflow value. While the employment of a clamping operation is not always desirable, it is generally considered to be better than an overflow that may cause wrapping or undesired bits stored in the particular multiplication circuitry.

Typically, when clamping is desired, it is performed in a sequential fashion. In other words, the arithmetic operation is performed first, and when the result is available, it is then analyzed for overflow. If clamping is required, a clamping value replaces the computed value.

Figure 1:
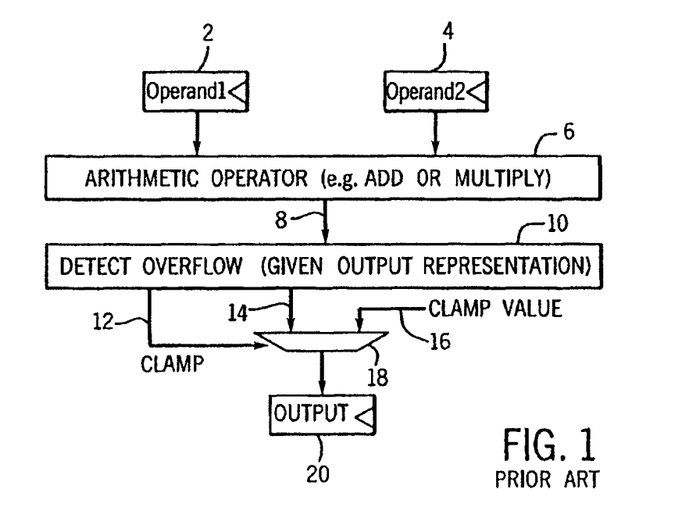
FIG. 1 is a schematic of a prior detection overflow scheme showing serial operand operation and overflow detection.

Referring now to FIG. 1, a prior system illustrates the serial processing in which the clamping analysis follows multiplication of particular operands. In this instance, operand 1 (reference numeral 2) and operand 2 (reference numeral 4) are input into an arithmetic operator 6. An output 8 from the arithmetic operator 6 is then directed into an overflow detection scheme 10. Any delays between arithmetic operator 6 and the overflow detection 10 are compounded, with each of their respective delays adding to the overall circuit delay. A clamp value 12 as determined by the overflow detection 10 is input along with a result 14 of the arithmetic operator 6, and a preset clamp value 16 into multiplexer 18. Multiplexer 18 selects the operation result 14 or the preset clamp value 16 in the instance of overflow detection based upon the logical level of clamp value 12. The result is then output into register 20.

A major problem with sequential operation is that any delays, for both the arithmetic operation and the overflow analysis, tend to compound and therefore yield a relatively slow circuit to the extent that all delays are combined and added together to determine the total circuit delay. In any arithmetic operation, multiplication delays tend to be the largest. Therefore, there exists a need to implement a circuit and method in which arithmetic operations such as multiplication may be performed along with overflow detection. The result is a circuit that eliminates the compounded delay made up of the accumulation of each individual delay associated with sequential overflow analysis and operand processing.

SUMMARY

The present disclosure provides overflow detection and clamping in parallel with multiplication of fixed-point multiplier operands that overcome the aforementioned problems, and provides a faster circuit than would otherwise be available from serial clamping analysis and arithmetic operation.

In accordance with one aspect of the disclosure, a method of detecting overflow in a clamping circuit includes inputting a first operand having a fixed-point format (i.e., represented by a fixed number of bits) into the clamping circuit and inputting a second operand having a second fixed-point format into the clamping circuit. A product overflow output is determined based upon the first and second fixed-point format. The method includes predicting whether multiplication of the first operand with the second operand yields a result that exceeds the product overflow output, and performing at least partially the multiplication of the first and second operands. The determining step occurs substantially in parallel with the performing step.

In accordance with another aspect of the disclosure, a method of clamp detection is disclosed, and includes inputting a first and second operand to both a multiplier and an overflow detection circuit. The method includes multiplying the first and second operands to generate a result not to exceed a pre-determined number of bits, and determining an initial clamping predictor bit based upon the first operand and the second operand. The initial clamping predictor bit is logically ORed with a most significant bit of the result to produce a final clamping predictor bit.

Again, the multiplying and determining steps occur substantially in parallel.

In yet another aspect of the disclosure, a multiplication overflow detection circuit is disclosed. The circuit includes multiplication circuitry for at least partially multiplying a first and a second operand, overflow detection circuitry receiving the first and second operands that detects whether a result of the multiplication of the first and second operands exceed a maximum representable positive or negative value. The multiplication circuitry and the overflow detection circuitry operate substantially in parallel.

BRIEF DESCRIPTION OF THE DRAWINGS

The drawings illustrate the best mode presently contemplated for carrying out the disclosure.

In the drawings.

DETAILED DESCRIPTION OF THE PREFERRED EMBODIMENT

Figure 2:
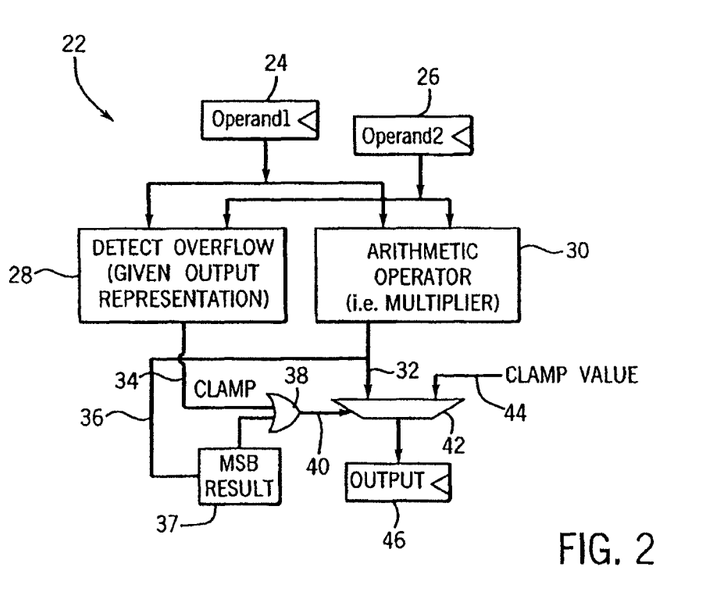
FIG. 2 is a schematic of parallel operation of an arithmetic operator and the overflow detection in accordance with the present disclosure.

Referring now to FIG. 2, a clamping system 22 in accordance with the present disclosure is illustrated. Operand 1 is loaded into register 24 and operand 2 is similarly loaded into register 26. Registers 24, 26 are preferably flip-flops, but any suitable register capable of storing the operands are contemplated. Also, the operands may be passed directly from other arithmetic operators or other related logic, if suitable for the application. Operand 1 and operand 2 are loaded in a fixed-point format.

In fixed-point arithmetic, numbers are represented by zero or one sign bit, zero or more integer bits, and zero or more fractional bits. The integer and fractional bits can be a magnitude, a 1s complement, or a 2s complement value. The most common case is the 2s complement case. A short-hand description is used to denote how many bits there are in each category. This description is typically: <sign-bits>.<integer-bits>.<fractional-bits> or s.i.f. For a signed number with 4 integer bits and 5 fractional bits the notation would be 1.4.5. For an unsigned number with 6 integer bits and 3 fractional bits the notation would be 0.6.3, and often the leading zero is omitted to yield 6.3.

For a given fixed-point representation s.i.f. there are associated numerical properties, (and assuming that the 2s complement is used):

Largest positive number representable: $2^i - 2^{-f}$
Largest (magnitude) negative number representable: $-2^i$
Smallest positive number representable: $2^{-f}$
Smallest (magnitude) negative number representable: $-2^{-f}$ When fixed-point numbers are used in arithmetic operations such as additions, subtractions, and multiplications, the results generally require more bits to avoid overflow.

The rules for the two types of operations are:

1. Addition and Subtraction:

If both inputs are of the same format s.i.f then the output requires s.(i+1).f to avoid overflow.

If the inputs are of different formats s.i1.f1 and s.i2.f2, then choose i=max(i1,i2) and f=max(f1,f2). Then the output requires s.(i+1).f bits to avoid overflow.

2. Multiplication:

If the inputs are of the same format s.i.f then the output requires s.(2*i+1).(2*f) to avoid overflow.

If the inputs are of different formats s.i1.f1 and s.i2.f2, then the output requires s.(i1+i2+1).(f1+f2) to avoid overflow.

Since multiplication most often produces the need for overflow detection and clamping, it is preferred that the present disclosure be utilized in multiplication of operand 1 and operand 2, with each operand in a fixed-point format. As FIG. 2 demonstrates, operand 1 and operand 2 are both supplied to overflow detection circuit 28 as well as an arithmetic operator or multiplier 30. The multiplier 30 takes operand 1 and operand 2 and determines at least a partial product of the binary operands. It is important to note that the multiplier 30 does not have to be full precision. It need only be twice the precision that is desired to be represented in the final result. For example, if it is desired to multiply two operands, each having eight bits, when the multiplication of eight bits and eight bits occurs, the answer will have sixteen bits of output. However, if it is only desired to have eight bits to come out in the final output, when the multiplication could actually generate up to sixteen bits, the multiplier will be used to generate nine bits. The nine bits represent twice the desired output range. Therefore, in the above-identified example, the answer will have a nine-bit result instead of the full sixteen-bit result. The final seven bits of the multiplication are not necessarily calculated.

Operand 1 and operand 2 are also presented to the overflow detection logic. The overflow detection circuit 28 occurs in parallel with the multiplier 30 operation. It is the substantially simultaneous processing of the overflow detection and the multiplication that produces the efficiencies in processing time for the circuit. Also, it is the fact that the full product need not necessarily be calculated that results in further efficiencies in processing time.

The overflow detection circuit 28 considers the two input operands and predicts whether or not they will cause the product to overflow. The overflow detection circuit 28 predicts when the product is going to be greater than or equal to two times the maximum desired value. This handles most of the clamping cases, but it is not exact. To get exact clamping, the product is computed to the (io+1)'th integer bit, and a most significant bit 37 of the product is used to finally determine whether or not to clamp.

The fixed-point format of the two inputs and the desired output must be known. These formats are denoted as:

Operand1: s.i1.f1
Operand2: s.i2.f2
Output: s.io.fo

The product of the two input operands will require s.(i1+i2+1).(f1+f2) to avoid overflow. The assumption is that io<i1+i2+1, (because, if io>i1+i2+1 then an overflow cannot occur).

EXAMPLE

Consider the simple case of two positive input operands that yield a positive product. The maximum positive number that can be represented by the desired output representation is:

$$2^{io} - 2^{-fo}$$

Therefore, any combination of input operands that yields a product greater than or equal to the maximum value should be clamped to the maximum positive value:

Output=op1*op2 if (op1*op2)<$2^{io} - 2^{-fo}$

Output=$2^{io} - 2^{-fo}$ if (op1*op2)≥$2^{io} - 2^{-fo}$

The result 32 of multiplier 30 (which will in a preferred embodiment be a partial multiplication) is output from the multiplier 30. The overflow detection circuit 28 outputs result (clamp bit 34) from its overflow detection circuitry, and as a result of a logical level of a clamp bit 34 it is determined whether clamping will occur. The most significant bit 37 (on line 36) of result 32 is logically ORed with clamp bit 34 through OR gate 38. Therefore, if any of clamp bit 34 or the most significant bit 37 is logically high, clamping will occur and a clamping signal 40 is output from OR gate 38. The clamping signal 40 is input into multiplexer 42. Result 32 of the multiplication is also input into multiplexer 42. Clamp value 44 is preferably hard-wired into multiplexer 42. The value of clamp value 44 is pre-determined depending on the number of bits in operand 1 and operand 2. Preferably, the clamp value is the maximum representable positive or negative value. It is contemplated that in selecting a positive or negative value for operand 1 or operand 2, the MSB (most significant bit) of each register 24, 26 could be exclusively ORed (XOR) together such that if the operands are of a different sign, the negative clamping value will be used for clamp value 44. Consequently, if both operands are of the same sign, the positive value for clamp value 44 will be used. Multiplexer 42 will select either result 32 or clamp value 44 depending upon the logical level of clamp signal 40, and will output the selection into output register 46.

Figure 3:
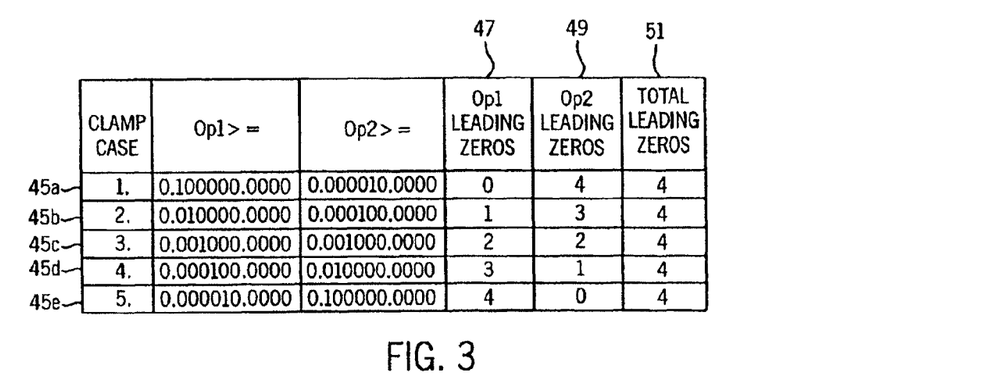
FIG. 3 is a table illustrating necessary information in determining whether to clamp multiplication of two operands in accordance with one aspect of the present disclosure.

Referring now to FIG. 3, a binary representation of several scenarios are given.

Take the case of two 1.6.4 operands, multiply them and return the product clamped to a 1.6.4 number. The maximum representable value in the output is $2^6 - 2^{-4} = 64 - 1/16 = 63.9375$. Some simple cases exist:

If op1≥32 and op2≥2 then clamp  (45a)

If op1≥16 and op2≥4 then clamp  (45b)

If op1≥8 and op2≥8 then clamp  (45c)

If op1≥4 and op2≥16 then clamp  (45d)

If op1≥2 and op2≥32 then clamp  (45e)

The binary representation of these scenarios is given in FIG. 3.

It can be seen that the number of leading zeros in the integer portion of the operands is indicative of the magnitude of the operands, and by adding the number of leading zeros of both op1 (47) and op2 (49), there is a constant number of leading zeros 51. Therefore, the fixed-point format of the operands will determine the constant number of leading zeros to determine whether clamping occurs. Clamping must occur when:

If (<op1 leading zeros>+<op2 leading zeros>)≤4 then clamp

Else don't clamp

This relatively simple predictor works for a substantial portion of products, but it is not completely accurate. If only this predictor were used, it would be possible to get products that could be as much as twice the desired max value, i.e., (max product given simple predictor)<2*(desired max value).

Therefore, to get an accurate clamp predictor, the above simple predictor is used, and the multiplication generates a result that is of format s.(io+1).fo. Then, for positive operands, an overflow is detected by ORing together the MSB of the integer bits and the clamp-prediction.

Figure 4:
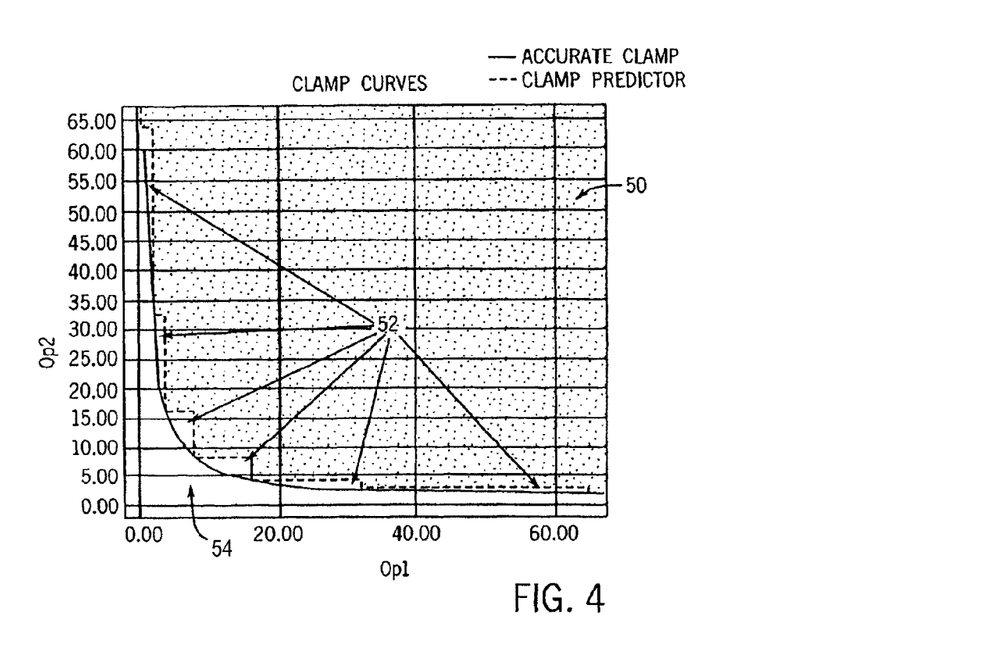
FIG. 4 is a graph illustrating a simple overflow predictor and the regions necessary for additional overflow prediction calculations.

Referring now to FIG. 4, a graph is shown showing the regions of products that are clamped by the initial clamp predictor. The broad region covered by the simple, initial clamp predictor is shown generally by the numeral 50. Regions 52 represent those products that require the io+1 integer bits of the product to get accurate overflow detection and therefore require more precise clamp prediction. Region 54 represents the region where clamping is not needed because the product does not exceed the desired number of bits. However, this graph is representative of only one particular set of operands (both positive). Other predictors will produce different data depending upon the signs of the operands.

GENERAL CASE

The general case consists of three subcases depending on the signs of the input operands:
Case 1: (op1>0 and op2>0)
Case 2: (op1<1 and op2<1)
Case 3: (op1>0 and op2<1) or (op1<0 and op2>0)
Each of these cases will be examined in turn.
Case 1: Both Operands are Positive
The simple clamp predictor is:
If the sum of the input operands' leading zeros is less than or equal to
(i1−io)+(i2−io)+(io−2)=i1+i2−io−2 then the circuit must clamp.

The accurate clamp prediction must use the (io+1) bit of the product, i.e., the product must be computed at least to (io+1) integer bits. This bit is ORed logically with the simple clamp predictor to yield the accurate clamp determination.
Case 2: Both Operands are Negative
When both operands are negative, their product is positive. Therefore, if an overflow case exists we clamp to the same value as mentioned before, namely:

$$2^{io} - 2^{-fo}$$

When both operands are negative the simple clamp predictor must count leading ones in the input operands. If the sum of the input operands' leading ones is less than or equal to
(i1−io)+(i2−io)+(io−1)=i1+i2−io−1 then the circuit must clamp.

However, there is an additional case, when both operands have only zeros after the leading ones (e.g., 111100.0000) then the simple clamp predictor should also clamp. This is like counting leading zeros on a bit-reversed version of each input. If the trailing zeros plus the leading ones equal (i+f) for both inputs then clamp. As before, the accurate clamp prediction must use the (io+1) bit of the product, i.e., the product must be computed at least to (io+1) integer bits. This bit is ORed logically with the simple clamp predictor to yield the accurate clamp determination.
Case 3: Only One of the Operands is Negative
When only one of the input operands is negative, their product will be negative. Therefore, if an overflow case exists we clamp to the largest (magnitude) negative value, namely, $-2^{io}$.

In this case, the simple clamp predictor must count leading ones for the negative input, and leading zeros for the positive input. Then, if the sum of the inputs' leading ones and leading zeros is less than or equal to (i1−io)+(i2−io)+(io−2)=i1+i2−io−2 then the circuit must clamp.

As before, the accurate clamp prediction must use the (io+1) bit of the product, i.e., the product must be computed at least to (io+1) integer bits. This bit is logically inverted, then ORed logically with the simple clamp predictor to yield the accurate clamp determination.

Figure 5:
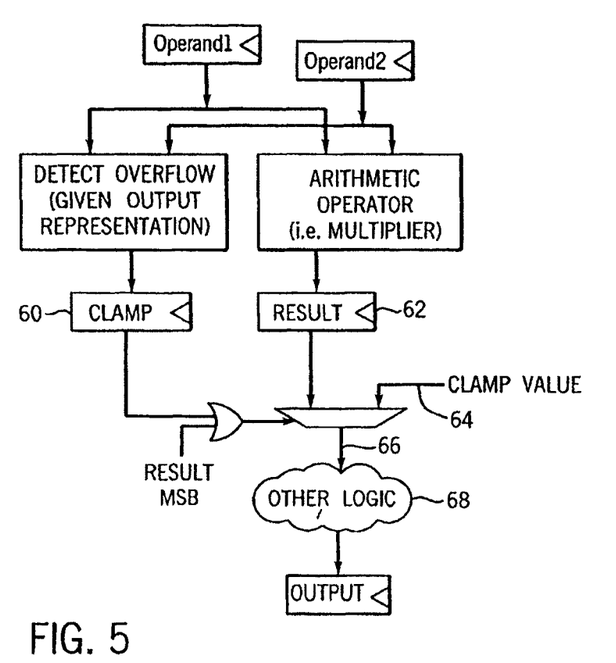
FIG. 5 shows a schematic of another aspect of the present disclosure.
Figure 6:
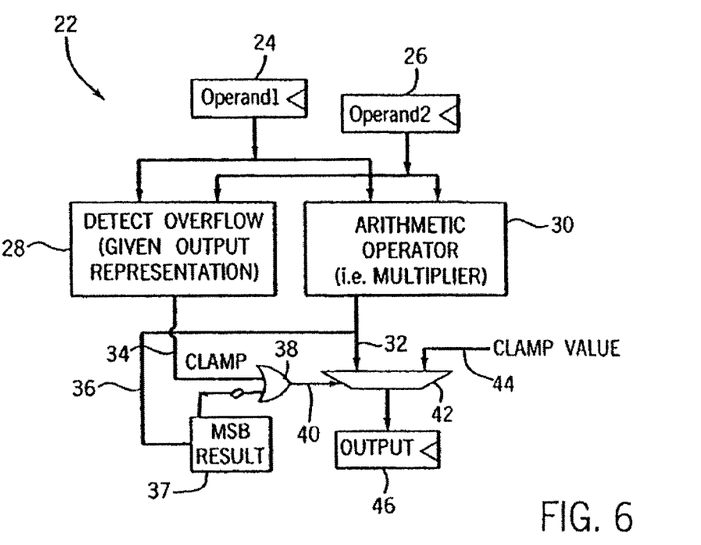
FIG. 6 shows a schematic of another aspect of the present disclosure.

Referring now to FIG. 5, another embodiment of the present disclosure is shown. In this embodiment, the clamp bit may be stored in a clamp bit register 60 and the result of the multiplier operation may be stored in multiplier result register 62. In this embodiment, after one of the result register 62 or clamp value 64 is selected, other logic 68 is introduced to process an output 66 as part of a pipelining stage. The pipelining stage enables further processing of a partial result if the computation is not completed in a single clock cycle. The clamp prediction along with a partial result is then saved for the following clock cycle where completion of the clamping prediction will occur in the second clock cycle.

The initial clamp predictor may be utilized as soon as the two operands are available. The final clamp predictor must occur after the result of the multiplier has completed its partial computation to the appropriate necessary bit. Therefore, the simple clamp prediction occurs at the same time as the multiplier as manipulating operand 1 and operand 2.

Although two operands are shown, it is contemplated by the present disclosure that any number of operands may be used as inputs to the multiplier operation. In addition, the multiplication may occur in several stages with other multiplications coming before or after in a similar manner. The cloud of logic represents other multiplications, other additions or other logic operations on the result of output 66 of the multiplexer.

The present disclosure has been described in terms of the preferred embodiment, and it is recognized that equivalents, alternatives, and modifications, aside from those expressly stated, are possible and within the scope of the appending claims.

What is claimed is:

1. An apparatus, comprising:
    multiplication circuitry configured to generate a multiplication result by at least partially multiplying a first operand and a second operand;
    overflow detection circuitry configured to generate a clamp bit indicative of a prediction that the multiplication result will exceed a maximum representable positive or negative value of an output, wherein the multiplication circuitry and the overflow detection circuitry are configured to operate independently and substantially in parallel with each other; and
    selection circuitry operably coupled to the multiplication circuitry and the overflow detection circuitry, the selection circuitry configured to select between the multiplication result and a clamp value as the output generated responsive to whether an overflow situation is determined by logically OR-ing a most significant bit of the multiplication result and the clamp bit.

2. The apparatus of claim 1, wherein the selection circuitry includes a multiplexor configured to select between the multiplication result and the clamp value based on a clamping signal received by the multiplexor.

3. The apparatus of claim 2, wherein the selection circuitry further includes an OR-gate operably coupled to the multiplexor, the overflow detection circuitry, and the multiplication circuitry, wherein the OR-gate is configured to generate the clamping signal responsive to perform the logically OR-ing of the clamp bit and the most significant bit of the multiplication result.

4. The apparatus of claim 2, wherein the clamp value is hardwired into the multiplexor.

5. The apparatus of claim 1, wherein the multiplication result is a partial multiplication result that is less than full precision.

6. The apparatus of claim 5, wherein the multiplication result has a precision that is two times a desired range for the output.

7. The apparatus of claim 1, wherein each of the first operand and the second operand are represented as fixed-point numbers having a sign portion, an integer portion, and a fractional portion.

8. The apparatus of claim 7, wherein the selection circuitry is configured to output the clamp value as either a positive value or a negative value by logically XOR-ing the sign portion of the first operand and the sign portion of the second operand.

9. The apparatus of claim 7, wherein the prediction is based, at least in part, on the overflow detection circuitry performing a sum of leading zeros in the integer portion of the first operand and leading zeros in the integer portion of the second operand.

10. The apparatus of claim 7, wherein the prediction is based, at least in part, on the overflow detection circuitry performing a sum of leading ones in the integer portion of the first operand and leading ones in the integer portion of the second operand.

11. The apparatus of claim 7, wherein:
    if both the first operand and the second operand are positive, the prediction is based on the overflow detection circuitry summing leading zeros in the integer portion of the first operand and leading zeros in the integer portion of the second operand;
    if both the first operand and the second operand are negative, the prediction is based on the overflow detection circuitry summing leading ones in the integer portion of the first operand and leading ones in the integer portion of the second operand; and
    if the first operand and the second operand have different signs, the prediction is based on the overflow detection circuitry summing leading ones in the integer portion of a negative operand and leading zeros in the integer portion of a positive operand.

12. The apparatus of claim 1, wherein the overflow detection circuitry is configured to assert the clamp bit responsive to determining that both the first operand and the second operand have only zeros after leading ones.

13. The apparatus of claim 1, further comprising:
    a first register operably coupled with the overflow detection circuit and the multiplication circuitry, the first register configured to receive the first operand; and
    a second register operably coupled with the overflow detection circuit and the multiplication circuitry, the second register configured to receive the second operand.

14. The apparatus of claim 1, further comprising:
    a clamp bit register coupled between the overflow detection circuitry and the selection circuitry, wherein the clamp bit register is configured to store the clamp bit; and
    a multiplier result register coupled between the multiplication circuitry and the selection circuitry, wherein the multiplier result register is configured to store the multiplication result.

15. The apparatus of claim 1, further comprising a clamping system that includes the multiplication circuitry, the overflow detection circuitry, and the multiplexor.

16. The apparatus of claim 1, wherein the clamp value is equal to the maximum representable positive or negative value of the output.

17. A method of processing operands in an arithmetic operation, the method comprising:
    generating a product by performing at least a partial multiplication of a plurality of operands;
    predicting overflow of the product to generate a clamp bit independently and substantially in parallel with performing the at least a partial multiplication; and
    generating a final result by selecting between the product and an overflow value responsive to logically OR-ing a most significant bit of the product and the clamp bit.

18. The method of claim 17, further comprising receiving the plurality of operands in multiplication circuitry and overflow prediction circuitry, the plurality of operands having a fixed-point format.

19. The method of claim 18, wherein generating a product includes generating a product to have a number of integer bits that is at least one bit greater than a number of integer bits of the final result.

20. The method of claim 17, wherein predicting overflow of the product includes overflow detection circuitry asserting the clamp bit if overflow of the product is predicted.

21. The method of claim 20, wherein selecting between the product and the overflow value responsive to logically OR-ing includes:
  selecting the product if neither the clamp bit nor the most significant bit of the product is asserted; and
  selecting the overflow value if at least one of the clamp bit and the most significant bit of the product is asserted.

22. The method of claim 20, wherein selecting between the product and the overflow value responsive to logically OR-ing includes:
  generating a clamping signal by logically OR-ing the clamp bit and the most significant bit of the product; and
  inputting the clamping signal into a multiplexor that selects either the product and the overflow value based on a logic value of the clamping signal.

23. A method of processing operands in an arithmetic operation, the method comprising:
  generating a product by performing at least a partial multiplication of a plurality of operands;
  predicting an overflow prediction of the product independently and substantially in parallel with performing the at least a partial multiplication; and
  clamping a final result to an overflow value if an overflow state is determined by logically OR-ing a most significant bit of the product and a clamp bit generated from the overflow prediction.

24. The method of claim 23, wherein clamping a final result to the overflow value includes selection circuitry selecting the overflow value as one of a positive value and a negative value depending on sign bits of the plurality of operands.

25. The method of claim 23, wherein generating a product produces a multiplication result having a number of bits that is at least (io+1) but less than ($\Sigma i_n$+1), wherein io is a number of bits for an integer portion of the final result, and $\Sigma i_n$ is a sum of a number of bits for the integer portions of each operand of the plurality of operands.

26. The method of claim 23, wherein predicting the overflow prediction includes summing at least one of leading ones and leading zeros of integer portions of each operand of the plurality of operands.

27. The method of claim 26, wherein clamping the final result to the overflow value occurs if a sum of a number of the leading zeros of each operand of the plurality of operands is less than or equal to $\Sigma i_n$-io-2, wherein io is a number of bits for an integer portion of the final result, and $\Sigma i_n$ is a sum of a number of bits for the integer portions of each operand of the plurality of operands.

28. The method of claim 26, wherein clamping the final result to the overflow value occurs if a sum of a number of the leading ones of each operand of the plurality of operands is less than or equal to $\Sigma i_n$-io-1, wherein io is a number of bits for an integer portion of the final result, and $\Sigma i_n$ is a sum of a number of bits for the integer portions of each operand of the plurality of operands.

29. The method of claim 26, wherein clamping the final result to the overflow value occurs if a sum of a number of the leading zeros of positive operands of the plurality of operands and a number of the leading ones of negative operands of the plurality of operands is less than or equal to $\Sigma i_n$-io-2, wherein io is a number of bits for an integer portion of the final result, and $\Sigma i_n$ is a sum of a number of bits for the integer portions of each operand of the plurality of operands.

* * * * *